United States Patent Office 3,477,011
Patented Nov. 4, 1969

3,477,011
AC TO DC VOLTAGE CONVERSION CIRCUIT
David John Sidney Westwood, London, England, assignor to Ferguson Radio Corporation Limited, London, England
Filed May 10, 1968, Ser. No. 728,375
Claims priority, application Great Britain, July 20, 1967, 33,466/67
Int. Cl. H02m 7/02
U.S. Cl. 321—15                6 Claims

ABSTRACT OF THE DISCLOSURE

A transformerless power supply derives a direct output voltage from an input voltage by connecting capacitors alternately in series and parallel synchronously with connecting them alternately to the input and the output of the power supply.

---

This invention relates to electrical power supplies which, when operated with an alternating current source, do not require the provision of a transformer.

To convert an alternating input voltage into a direct output voltage which has a value different from that produced by simple rectification, it is usual to use a transformer. A transformer, however, is heavy and sometimes expensive, and when used in the vicinity of a cathode ray tube the magnetic field that it produces can be troublesome. If the output voltage desired is lower than the peak voltage of the alternating input voltage, it is alternatively possible to use a gate system which applies the input voltage to a load connected to the output only whilst the input voltage is in a predetermined voltage range. Such systems can lead to high current pulses in the input circuit and hence in the source, particularly for low output voltages, which may raise difficulties due to the finite resistance of the source and the resulting source-loading power factor.

According to one aspect of the invention there is provided a method of deriving a direct output voltage from an input voltage, comprising the steps of so connecting two or more capacitors in series arrangement and in parallel arrangement alternatively in time that the capacitors charge up from the input voltage in one arrangement and discharge through the output in the other arrangement. This aspect of the invention has particular utility with an alternating input voltage, but may be employed with a direct input voltage. If the input voltage is alternating, it is convenient to charge the capacitors during one part of the cycle, (preferably during one half-cycle) and to discharge them during another part of the cycle, (preferably the other half-cycle).

According to a second aspect of the invention there is provided a power supply for suplying a direct output voltage from an input voltage, comprising two or more capacitors, and switching means for alternately connecting the capacitors in series arrangement and in parallel arrangement, and also for connecting the capacitors to the input when in one of the arrangements and to the output when in the other arrangement. The switching means may comprise a number of diodes and/or transistor switches.

Figure 1:
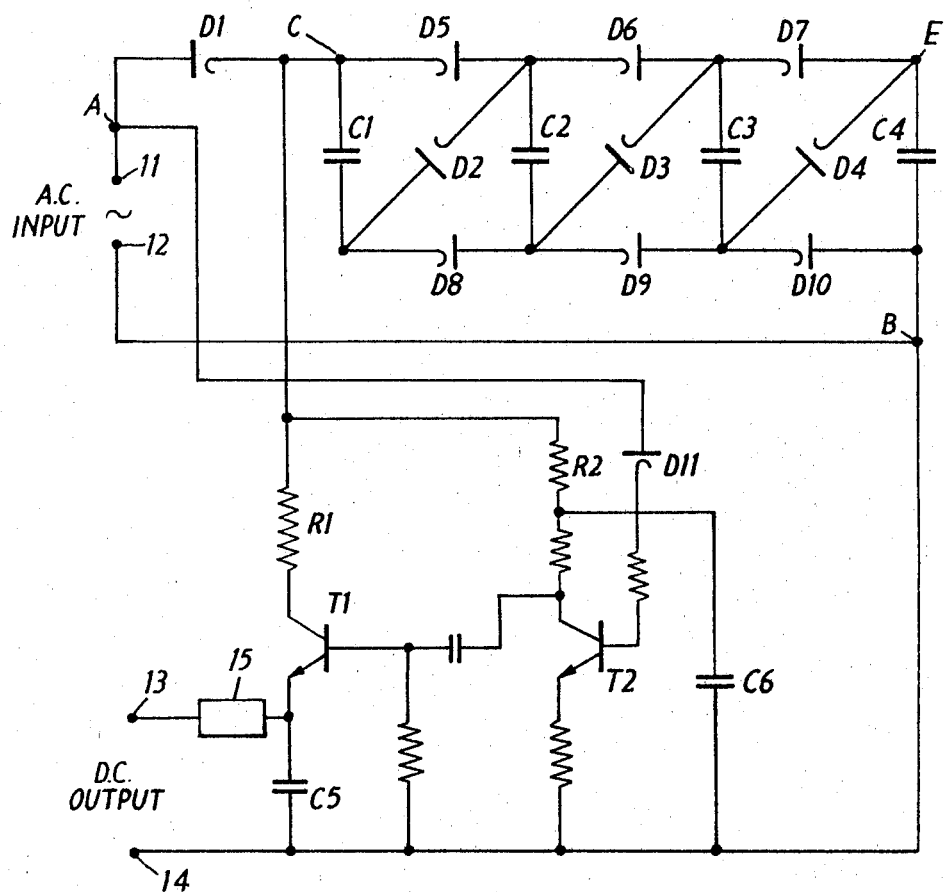
Figure 2:
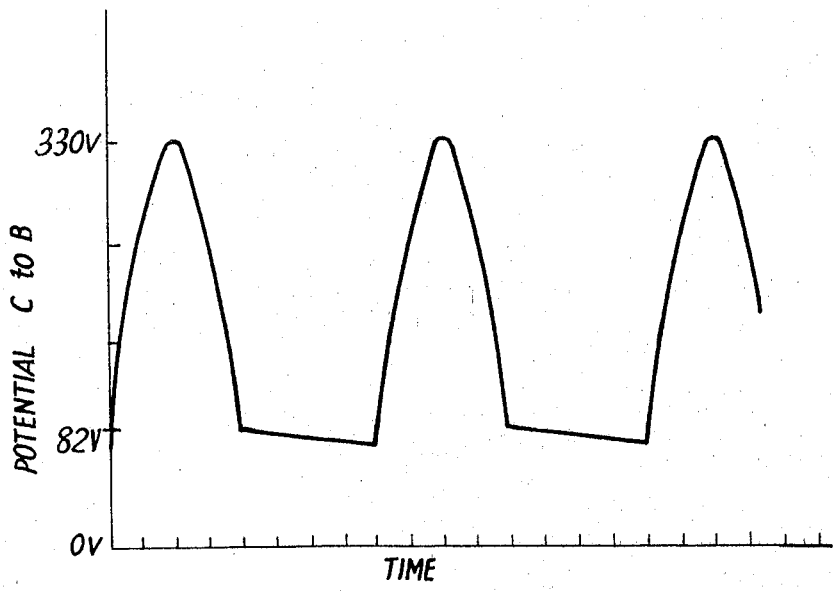

An embodiment of the invention will now be described, by way of example, with reference to the accompanying drawings, in which:

FIGURE 1 is a circuit diagram of a power supply embodying the invention in its second aspect; and FIGURE 2 shows the voltage across the circuit including capacitors C1 to C4 of the circuit shown in FIGURE 1.

The circuit shown is for use with an alternating input voltage and produces a direct output voltage which is less than that which would be obtained by simple rectification. The circuit is suitable for use with a 240 volts RMS a.c. input in which case it produces an output of approximately 80 volts D.C.

The circuit includes four capacitors C1, C2, C3 and C4, of equal capacity which are connected by diodes D2 to D10. The diodes D2, D3 and D4 serve effectively to connect the capacitors in series when point C is sufficiently positive with respect to B, and the diodes D5 to D10 effectively connect the capacitors in parallel when point C is negative with respect to $(B+82)$ volts. Point C is connected through a diode D1 to one input terminal 11 and point B is connected directly to the other input terminal 12.

The lower half of FIGURE 1 shows a switching circuit which connects the capacitors C1 to C4 to the output during part only of the cycle of the input voltage. A transistor T1 is connected between the point C and an output terminal 13 and acts as a switch. The switch is driven by a limiting-amplifier transistor T2. A diode D11 is included to limit the reverse base current in the transistor T2, and a resistor R1 is included to limit transient currents through the switch. A condenser C5 and a filter 15 constitute an output smoothing circuit. A capacitor C6 and a resistor R2 provide a suitably smoothed supply for the collector circuit of the transistor T2.

A current-limiting circuit (not shown) may be added to switch off the transistor T2 if the output current exceeds a predetermined value, thus providing an automatic cut-out.

In operation, when point C is sufficiently positive with respect to point B the capacitors C1 to C4 are charged in series through the diodes D2, D3 and D4. The diodes D5 to D10 are reverse-biased and thus present a substantially infinite resistance. The capacitors are together charged to a total of, say, 330 volts, and therefore the voltage drop across each capacitor is 82 volts. The potential across the capacitors during the cycle is shown in FIGURE 2. When the voltage at C is less than the sum of the voltages across C1 to C4, the diode D1 ceases to conduct. When the voltage at C becomes negative, the transistor switch is closed and the capacitors C1 to C4 are connected in parallel and to the output terminals 13 and 14. Since they are in parallel they give an output voltage of about 80 volts.

While it is convenient to operate the transistor switch in synchronism with the input voltage, this is not essential, and other forms of switch may be used to disconnect the capacitors from the input and connect them to the output. However, when the switch operates in synchronism with an alternating input voltage, the diode D1 can be used to disconnect the capacitors from the input, and the switch is only required to connect them to and disconnect them from the output.

In a modification of the circuit shown in FIGURE 1, the diodes D5, D6 and D7 are replaced by transistor switches, which operate in similar manner to the switch shown in the lower part of FIGURE 1. If this is the case the output terminals may be connected directly to points E and B.

I claim:

1. A power supply circuit for supplying a direct output voltage from an alternating input voltage, said circuit comprising:

an alternating input voltage,
    a plurality of capacitors,
    an output voltage,
    means for sensing the instantaneous sense of said input voltage, and means connecting said capacitors in a first arrangement, said first arrangement being selected from the group comprising series arrangement and parallel arrangement, and connecting said capacitors to said sensing means, said connecting means subsequently reconnecting said capacitors in a second arrangement, said second arrangement being the other one of said arrangements in said group comprising series arrangement and parallel arrangement, and connecting said capacitors to said output.

2. A power supply circuit as claimed in claim 1, said connecting means comprising
   a first diode, said first diode connecting each of said capacitors in series with one other of said capacitors, and
   two second diodes, said second diodes connecting each of said capacitors in parallel with at least one other of said capacitors, said second diodes being poled in the opposite sense to said first diode as seen by said input.

3. A power supply circuit as claimed in claim 1, and connecting means comprising
   a diode and
   means connecting said diode between said capacitors and said input in response to said sensing means.

4. A power supply circuit as claimed in claim 1, said connecting means comprising
   a transitor switch, said switch being connected between said capacitors and said output, and
   means operating said switch in response to said sensing means.

5. A power supply circuit as claimed in claim 1, said circuit further comprising
   a smoothing circuit, and
   means connecting said smoothing circuit between said capacitors and said output.

6. A power supply circuit as claimed in claim 1, said circuit further comprising
   a current-limiting device, and
   means connecting said current-limiting device between said capacitors and said output.

References Cited

UNITED STATES PATENTS 3,229,124   1/1966   Schofield _____ 321—15 XR

OTHER REFERENCES

"D-C Converter Circuit Uses Capacitors," Marzolf, J. M., Electronics, March 21, 1966, pp. 97–98.

JOHN F. COUCH, Primary Examiner

W. M. SHOOP, Jr., Assistant Examiner

U.S. Cl. X.R.

307—110